A. MAXWELL.

Improvement in Sash-Holders.

No. 126,891.  Patented May 21, 1872.

Witnesses  
Inventor  
Arthur Maxwell 126,891

UNITED STATES PATENT OFFICE.

ARTHUR MAXWELL, OF SHELBURNE FALLS, MASSACHUSETTS.

IMPROVEMENT IN SASH-HOLDERS.

Specification forming part of Letters Patent No. 126,891, dated May 21, 1872.

Specification describing a certain improved device for supporting and holding in position window-sash, and in certain cases window-blinds, by ARTHUR MAXWELL, of Shelburne Falls, in the county of Franklin and State of Massachusetts.

My invention relates to the supporting and holding in any desired position of window-sash, and in certain cases window-blinds, by means of a wedge attached to a bent lever, and moved by a handle into a wedge-shaped notch or recess cut in the window-frame, as hereinafter set forth; and the recess may be made and the holder placed in the window-sash or in the window-blind.

Figure 2:
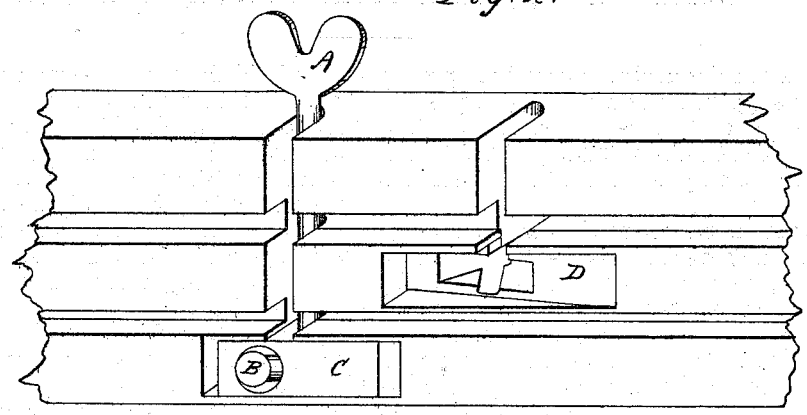
Figure 1:
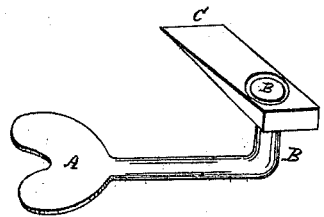

Figure 1 is a view of the holder detached. Fig. 2 is a section of window-sash and window-frame, showing the holder in place in the wedge-shaped recess D.

A is the handle, to which is firmly attached the bent lever B, and at the end of the said lever, opposite that by which it is attached to the handle A, is loosely attached the wedge C, which wedge is intended to fill the recess D, cut in the window-frame, and hold the window-sash when placed in position.

To hold the window-sash at a certain point, let it be raised or lowered to that point; then the handle A should be turned toward the window-sash, which movement operates the bent lever B and causes it to force downward the wedge C so as to fill the recess D. Thus the wedge C, forced downward between the window-frame and window-sash, and into the recess D, firmly holds the window-sash at the point desired.

Having thus fully described my invention, what I claim as new, and desire to secure by Letters Patent, is—

The improved sash-holder, consisting of the bent lever B having a handle, A, in combination with and loosely fitting to the wedge C, which works in a corresponding wedge-shaped recess, D, of the window-frame, whereby either the upper or lower sash is wedged and held in desired position, all constructed, arranged, and operating as described, for the purposes set forth.

ARTHUR MAXWELL.

Witnesses:
   A. K. HAWKS,
   G. W. JENKS.